(12) United States Patent
Singer et al.

(10) Patent No.: US 11,022,762 B2
(45) Date of Patent: Jun. 1, 2021

(54) OPTICAL FIBER CONNECTORS FOR ROTATIONAL ALIGNMENT

(71) Applicant: Chiral Photonics, Inc., Pine Brook, NJ (US)

(72) Inventors: Jonathan Singer, New Hope, PA (US); Victor Il'ich Kopp, Fair Lawn, NJ (US); Christopher W. Draper, Allendale, NJ (US); Zhou Shi, Pine Brook, NJ (US); Norman Chao, Brooklyn, NY (US)

(73) Assignee: Chiral Photonics, Inc., Pine Brook, NJ (US)

(*) Notice: Subject to any disclaimer, the term of this patent is extended or adjusted under 35 U.S.C. 154(b) by 0 days.

(21) Appl. No.: 16/710,463

(22) Filed: Dec. 11, 2019

(65) Prior Publication Data

US 2021/0041640 A1 Feb. 11, 2021

Related U.S. Application Data

(60) Provisional application No. 62/883,004, filed on Aug. 5, 2019.

(51) Int. Cl.
*G02B 6/38* (2006.01)
(52) U.S. Cl.
CPC ........... *G02B 6/3874* (2013.01); *G02B 6/383* (2013.01); *G02B 6/3851* (2013.01); *G02B 6/3853* (2013.01); *G02B 6/3885* (2013.01)
(58) Field of Classification Search
None
See application file for complete search history.

(56) References Cited

U.S. PATENT DOCUMENTS

| 4,140,367 | A | * | 2/1979 | Makuch | G02B 6/406 385/59 |
| 5,679,025 | A | * | 10/1997 | Barnes, Jr. | G02B 6/3807 385/72 |
| 6,396,859 | B1 | | 5/2002 | Kopp et al. | |
| 6,404,789 | B1 | | 6/2002 | Kopp et al. | |
| 6,411,635 | B1 | | 6/2002 | Kopp et al. | |

(Continued)

FOREIGN PATENT DOCUMENTS

WO  WO 2002/073247 A2  9/2002
WO  WO 2006/046947 A2  5/2006

(Continued)

OTHER PUBLICATIONS

T. J. Seok, V. Kopp, D. Neugroschl, J. Henriksson, J. Luo, and M. C. Wu, "High density optical packaging of high radix silicon photonic switches," 2017 Optical Fiber Communications Conference and Exhibition (OFC), Los Angeles, CA, Optical Society of America, pp. 1-3 (2017).

(Continued)

*Primary Examiner* — Chad H Smith
(74) *Attorney, Agent, or Firm* — Knobbe, Martens, Olson & Bear, LLP

(57) ABSTRACT

An optical fiber connector configured to rotationally align a first optical fiber with a second optical fiber is provided. The connector can include at least two rotational alignment features. At least one of the two rotational alignment features can include at least one ferrule configured to hold at least the first optical fiber.

17 Claims, 3 Drawing Sheets

(56) References Cited

U.S. PATENT DOCUMENTS

| | | | |
|---|---|---|---|
| 6,671,293 B2 | 12/2003 | Kopp et al. | |
| 6,678,297 B2 | 1/2004 | Kopp et al. | |
| 6,721,469 B2 | 4/2004 | Kopp et al. | |
| 6,741,631 B2 | 5/2004 | Kopp et al. | |
| 6,744,943 B2 | 6/2004 | Kopp et al. | |
| 6,792,169 B2 | 9/2004 | Kopp et al. | |
| 6,839,486 B2 | 1/2005 | Kopp et al. | |
| 6,875,276 B2 | 4/2005 | Shibayev et al. | |
| 6,891,992 B2 | 5/2005 | Kopp et al. | |
| 6,925,230 B2 | 8/2005 | Kopp et al. | |
| 7,009,679 B2 | 3/2006 | Kopp et al. | |
| 7,095,911 B2 | 8/2006 | Kopp et al. | |
| 7,142,280 B2 | 11/2006 | Kopp et al. | |
| 7,156,560 B2 | 1/2007 | Seeley | |
| 7,242,702 B2 | 7/2007 | Kopp et al. | |
| 7,308,173 B2 | 12/2007 | Kopp et al. | |
| 7,463,800 B2 | 12/2008 | Kopp et al. | |
| 7,983,515 B2 | 7/2011 | Zhang et al. | |
| 8,218,921 B2 | 7/2012 | Kopp et al. | |
| 8,326,099 B2 | 12/2012 | Singer et al. | |
| 8,457,456 B2 | 6/2013 | Kopp et al. | |
| 8,463,094 B2 | 6/2013 | Kopp et al. | |
| 8,712,199 B2 | 4/2014 | Kopp et al. | |
| 8,948,547 B2 | 2/2015 | Kopp | |
| 9,766,407 B2 | 9/2017 | Weiner et al. | |
| 9,810,845 B2 | 11/2017 | Kopp | |
| 9,817,191 B2 | 11/2017 | Kopp et al. | |
| 9,851,510 B2 | 12/2017 | Kopp | |
| 9,857,536 B2 | 1/2018 | Kopp et al. | |
| 9,885,825 B2 | 2/2018 | Kopp | |
| 9,921,355 B2 | 3/2018 | Weiner et al. | |
| 9,983,362 B2 | 5/2018 | Kopp et al. | |
| 10,078,019 B2 | 9/2018 | Kopp et al. | |
| 10,101,536 B2 | 10/2018 | Kopp et al. | |
| 10,126,494 B2 | 11/2018 | Kopp | |
| 10,197,736 B2 | 2/2019 | Kopp | |
| 10,323,227 B2 | 6/2019 | Majeed et al. | |
| 10,353,227 B2 | 7/2019 | Kopp et al. | |
| 10,481,324 B2 | 11/2019 | Churikov et al. | |
| 10,502,898 B2 | 12/2019 | Kopp | |
| 10,564,348 B2 | 2/2020 | Kopp et al. | |
| 10,564,360 B2 | 2/2020 | Kopp et al. | |
| 10,761,271 B2 | 9/2020 | Kopp | |
| 10,838,155 B2 | 11/2020 | Kopp et al. | |
| 2002/0003827 A1 | 1/2002 | Genack et al. | |
| 2002/0069676 A1 | 6/2002 | Kopp et al. | |
| 2002/0071881 A1 | 6/2002 | Kopp et al. | |
| 2002/0118710 A1 | 8/2002 | Kopp et al. | |
| 2002/0172461 A1 | 11/2002 | Singer et al. | |
| 2003/0118285 A1 | 6/2003 | Kopp et al. | |
| 2004/0145704 A1 | 7/2004 | Kopp et al. | |
| 2005/0196105 A1* | 9/2005 | Liu | G02B 6/3885 385/78 |
| 2005/0226560 A1 | 10/2005 | Kopp et al. | |
| 2006/0018603 A1* | 1/2006 | Greub | G02B 6/3812 385/60 |
| 2008/0098772 A1 | 5/2008 | Kopp et al. | |
| 2009/0324159 A1 | 12/2009 | Kopp et al. | |
| 2010/0002983 A1 | 1/2010 | Kopp et al. | |
| 2010/0158438 A1 | 6/2010 | Churikov et al. | |
| 2011/0292676 A1 | 12/2011 | Weiner et al. | |
| 2011/0293219 A1 | 12/2011 | Weiner et al. | |
| 2012/0189241 A1 | 7/2012 | Kopp et al. | |
| 2012/0257857 A1 | 10/2012 | Kopp et al. | |
| 2013/0121641 A1 | 5/2013 | Singer et al. | |
| 2013/0188174 A1 | 7/2013 | Kopp et al. | |
| 2013/0188175 A1 | 7/2013 | Kopp et al. | |
| 2013/0216184 A1 | 8/2013 | Kopp et al. | |
| 2015/0212274 A1 | 7/2015 | Kopp | |
| 2017/0219774 A1 | 8/2017 | Kopp | |
| 2017/0268937 A1 | 9/2017 | Kopp et al. | |
| 2017/0269277 A1 | 9/2017 | Weiner et al. | |
| 2017/0269293 A1 | 9/2017 | Churikov et al. | |
| 2017/0336659 A1 | 11/2017 | Kopp et al. | |
| 2019/0025501 A1 | 1/2019 | Kopp | |
| 2019/0049657 A1 | 2/2019 | Kopp et al. | |
| 2019/0154928 A1* | 5/2019 | Nielson | G02B 6/3885 |
| 2019/0243069 A1 | 8/2019 | Kopp | |
| 2020/0041724 A1 | 2/2020 | Kopp et al. | |
| 2020/0064563 A1 | 2/2020 | Kopp et al. | |

FOREIGN PATENT DOCUMENTS

| | | |
|---|---|---|
| WO | WO 2008/080174 A1 | 7/2008 |
| WO | WO 2009/158661 A2 | 12/2009 |
| WO | WO 2010/009101 A2 | 1/2010 |
| WO | WO 2010/071861 A2 | 6/2010 |
| WO | WO 2017/053479 A1 | 3/2017 |
| WO | WO 2017/100667 A1 | 6/2017 |
| WO | WO 2018/085435 A1 | 5/2018 |
| WO | WO 2018/227008 A1 | 12/2018 |
| WO | WO 2020/068695 A1 | 4/2020 |
| WO | WO 2020/077285 A1 | 4/2020 |

OTHER PUBLICATIONS

P. De Heyn, V.I. Kopp, S. A. Srinivasan, P. Verheyen, J. Park, M.S. Wlodawski, J. Singer, D. Neugroschl, B. Snyder, S. Balakrishnan, G. Lepage, M. Pantouvaki, P. Absil, and J. Van Campenhout, "Ultra-dense 16×56Gb/s NRZ GeSi EAM-PD arrays coupled to multicore fiber for short-reach 896Gb/s optical links," 2017 Optical Fiber Communications Conference and Exhibition (OFC), Los Angeles, CA, Optical Society of America, pp. 1-3 (2017).

V.I. Kopp, J. Park, M.S. Wlodawski, J. Singer, D. Neugroschl, P. de Heyn, B. Snyder, J. Van Campenhout, and P. Absil, "Flexible, Multi-channel, Ultra-dense Optical Interface for Silicon Photonics," ECOC 2016; 42nd European Conference on Optical Communications, Dusseldorf, Germany, 755-757 (2016).

P. Liao, M. Sakib, F. Lou, J. Park, M. Wlodawski, V.I. Kopp, D. Neugroschl, and O. Liboiron-Ladouceur, "Ultradense Silicon Photonic Interface for Optical Interconnection," in IEEE Photonics Technology Letters, vol. 27, No. 7, pp. 725-728 (2015).

V.I. Kopp, J. Park, M. Wlodawski, E. Hubner, J. Singer, D. Neugroschl, A. Z. Genack, P. Dumon, J. Van Campenhout, and P. Absil, "Two-Dimensional, 37-Channel, High-Bandwidth, Ultra-Dense Silicon Photonics Optical Interface," Journal of Lightwave Technology, vol. 33, No. 3, pp. 653-656 (2015).

V. I. Kopp, J. Park, M. S. Wlodawski, E. Hubner, J. Singer, D. Neugroschl, and A. Z. Genack, "Vanishing Core Optical Waveguides for Coupling, Amplification, Sensing, and Polarization Control," in Advanced Photonics, OSA Technical Digest (online), paper SoW1B.3, Optical Society of America, pp. 1-3 (2014).

M. Wlodawski, V.I. Kopp, J. Park, J. Singer, E. Hubner, D. Neugroschl, N. Chao, and A.Z. Genack, "A new generation of ultra-dense optical I/O for silicon photonics," Proceedings of SPIE—The International Society for Optical Engineering. vol. 8990, 899006, pp. 1-12 (2014).

V.I. Kopp, J. Park, M. Wlodawski, J. Singer, and D. Neugroschl, "Polarization maintaining, high-power and high-efficiency (6+1)×1 pump/signal combiner", Proc. SPIE 8961, Fiber Lasers XI: Technology, Systems, and Applications, 89612N, pp. 1-6 (2014).

V. I. Kopp, J. Park, M. Wlodawski, J. Singer, D. Neugroschl and A. Z. Genack, "Chiral Fibers: Microformed Optical Waveguides for Polarization Control, Sensing, Coupling, Amplification, and Switching," in Journal of Lightwave Technology, vol. 32, No. 4, pp. 605-613 (2014).

D. Neugroschl, J. Park, M. Wlodawski, J. Singer, and V.I. Kopp, "High-efficiency (6+1)×1 combiner for high power fiber lasers and amplifiers", Proc. SPIE 8601, Fiber Lasers X: Technology, Systems, and Applications, 860139, pp. 1-6 (2013).

V. I. Kopp, J. Park, M. Wlodawski, J. Singer, D. Neugroschl and A. Z. Genack, "Pitch Reducing Optical Fiber Array and multicore fiber for space-division multiplexing," 2013 IEEE Photonics Society Summer Topical Meeting Series, Waikoloa, HI, pp. 99-100 (2013).

V. I. Kopp, J. Park, M. Wlodawski, J. Singer, D. Neugroschl and A. Z. Genack, "Pitch Reducing Optical Fiber Array for dense optical interconnect," IEEE Avionics, Fiber-Optics and Photonics Digest CD, Cocoa Beach, FL, 2012, pp. 48-49.

(56) References Cited

OTHER PUBLICATIONS

J. Park, M.S. Wlodawski, J. Singer, D. Neugroschl, A.Z. Genack, V.I. Kopp, "Temperature and Pressure Sensors Based on Chiral Fibers", Proc. of SPIE 8370, 837008, pp. 1-8 (2012).
F.E. Doany, B.G. Lee, S.Assefa, W.M.J. Green, M. Yang, C.L. Schow, C.V. Jahnes, S. Zhang, J. Singer, V.I. Kopp, J.A. Kash, and Y.A. Vlasov, "Multichannel High-Bandwidth Coupling of Ultra-Dense Silicon Photonic Waveguide Array to Standard-Pitch Fiber Array", IEEE J. of Lightwave Technology, 29, 4, 475-482 (2011).
V.I. Kopp, J. Singer, D. Neugroschl, and A.Z. Genack, "Chiral fiber sensors for harsh environments", Proc. SPIE 8028, Fiber Optic Sensors and Applications VIII, 802803, pp. 1-8 (2011).
V.I. Kopp and A.Z. Genack, "Chiral Fibres: Adding Twist", Nature Photonics 5, 470-472 (2011).
V.I. Kopp, V.M. Churikov, J. Singer, D. Neugroschl, and A.Z. Genack, "Chiral fiber sensors," Proc. SPIE 7677, Fiber Optic Sensors and Applications VII, 76770U, pp. 1-6 (2010).
V.M. Churikov, V.I. Kopp, and A.Z. Genack, "Chiral diffraction gratings in twisted microstructured fibers", Opt. Lett. 35(3), 342-344 (2010).
S. Guillemet, D. Kinet, A. Bertrand, Y. Hernandez, and D. Giannone, "High Power All-In-Fibre Linearly Polarized Laser Using Chiral Grating-Based Polarizer", 4th EPS-QEOD Europhoton Conference, 1 page (2010).
C. R. Doerr, L. Zhang, P. J. Winzer, "Monolithic InP Multi-Wavelength Coherent Receiver", Proc. OFC, paper PDPB1, Optical Society of America, pp. 1-3, (2010).
S. Guillemet, D. Kinet, A. Bertrand, Y. Hernandez, and D. Giannone, "Experimental study and comparison of three innovative high power CW polarised all-in-fibre laser designs", IEEE Photonics Benelux Chapter, 141-144 (2010).
H. Henschel, S.K. Hoeffgen, J. Kuhnhenn and U. Weinand, "High Radiation Sensitivity of Chiral Long Period Gratings", IEEE Transaction on Nuclear Science, 57, 5, 2915-2922 (2010).
V.M. Churikov, V.I. Kopp, A.Z. Genack, "Dual-twist fiber long period gratings", Proceedings of SPIE 7212, 72120H, pp. 1-9 (2009).
V.I. Kopp, G. Zhang, S. Zhang, A.Z. Genack, and D. Neugroschl, "Chiral fiber optical isolator", Proceedings of SPIE 7195, 71950B, pp. 1-8 (2009).
S. Zhang, V.I. Kopp, V. Churikov, and G. Zhang, "PANDA-based chiral in-fiber linear polarizers", Proceedings of SPIE 7212, 72120D, pp. 1-8 (2009).
G.Shvets, S. Trendafilov, V.I. Kopp, D. Neugroschl, and A.Z. Genack, "Polarization properties of chiral fiber gratings", J. Opt. A: Pure Appl. Opt. 11, 074007, pp. 1-10 (2009).
C.R. Doerr, L. Zhang, L. Buhl, V.I. Kopp, D. Neugroschl, and G. Weiner, "Tapered Dual-Core Fiber for Efficient and Robust Coupling to InP Photonic Integrated Circuits", Proc. OFC, Optical Society of America, pp. 1-3 (2009).
D. Neugroschl, V.I. Kopp, J. Singer, and G. Zhang, "Vanishing-core tapered coupler for interconnect applications", Proceedings of SPIE 7221, 72210G, pp. 1-8 (2009).
V. I. Kopp, V. M. Churikov, and A. Z. Genack, "Chiral Fiber Gratings Sense the Environment", Laser Focus World, 76-79 (2008).
V. I. Kopp and A. Z. Genack, "Chiral fibers", Chapter 12 in Specialty Optical Fibers Handbook edited by Alexis Mendez and T. F. Morse. Academic Press, 401-427 (2007).
V. I.Kopp, V. M. Churikov, G. Zhang, J. Singer, C. W. Draper, N. Chao, D. Neugroschl, and A.Z. Genack, "Single- and double-helix chiral fiber sensors", J. Opt. Soc. Am. B 24(10), A48-A52 (2007).

V. I. Kopp, V. M. Churikov, G. Zhang, J. Singer, C. W. Draper, N. Chao, D. Neugroschl, and A.Z. Genack, "Chiral fiber gratings: perspectives and challenges for sensing applications", (Invited Paper), Proceedings of SPIE 6619, 66190B, pp. 1-8 (2007).
V. I. Kopp, V. M. Churikov, and A. Z. Genack, "Synchronization of optical polarization conversion and scattering in chiral fibers", Optics Letters 31(5), 571-573 (2006).
A. Z. Genack, V. I. Kopp, V. M. Churikov, J. Singer, N. Chao, and D. Neugroschl, "From planar to fiber chiral gratings", (Invited Paper), Proceedings of SPIE 5741, 90-97 (2005).
A. Z. Genack, V. I. Kopp, V. M. Churikov, J. Singer, N. Chao, and D. Neugroschl, "Chiral fiber Bragg gratings", Proceedings of SPIE 5508, 57, pp. 1-8 (2004).
V.I. Kopp, V.M. Churikov, J. Singer, N. Chao, D. Neugroschl, and A. Z. Genack, "Chiral fiber gratings", Science 305, 74-75 (2004).
V. I. Kopp, A. Z. Genack, V. M. Churikov, Jonathan Singer and Norman Chao, "Chiral Fiber Gratings Polarize Light", Photonics Spectra 38, 78-79 (2004).
V. I. Kopp, R. Bose, and A.Z. Genack, "Transmission through chiral twist defects in anisotropic periodic structures", Optics Letters 28(5), 349-351 (2003).
P.V. Shibaev, V.I. Kopp, and A.Z. Genack, "Photonic materials based on mixtures of cholesteric liquid crystals with polymers", J. Phys. Chem. B.107, 6961-6964 (2003).
V.I. Kopp, Z.-Q. Zhang and A.Z. Genack, "Lasing in chiral photonic structures", Progress in Quantum Electronics 27, 369-416 (2003).
V.I. Kopp and A.Z. Genack, "Double-helix chiral fibers", Optics Letters 28(20), 1876-1878 (2003).
P.V. Shibaev, K. Tang, A.Z. Genack, V. Kopp, and M. M. Green, "Lasing from a stiff chain polymeric lyotropic cholesteric liquid crystal", Macromolecules 35(8), 3022-3025 (2002).
V.I. Kopp and A.Z. Genack, "Twist defect in chiral photonic structures", Physical Review Letters 89(3), 033901, pp. 1-4 (2002).
V. I. Kopp, P. V. Shibaev, R. Bose, and A. Z. Genack, "Anisotropic photonic-bandgap structures", Proceedings of SPIE 4655, 141-149 (2002).
V.I. Kopp, Z.-Q. Zhang and A.Z. Genack, "Large coherence area thin-film photonic stop-band lasers", Physical Review Letters 86(9), 1753-1756 (2001).
V. I. Kopp and A. Z. Genack, "Density of states and lasing at the edge of a photonic stop band in dye-doped cholesteric liquid crystals", Proceedings of SPIE 3623, 71-79 (1999).
V.I. Kopp and A.Z. Genack, "Lasing at the edge of a photonic stop band in cholesteric liquid crystals", IEEE LEOS 13, No. 2, 8-10 (1999).
V.I. Kopp, B.Fan, H.K.M. Vithana, and A.Z. Genack, "Low-threshold lasing at the edge of a photonic stop band in cholesteric liquid crystals", Optics Letters 23(21), 1707-1709 (1998).
B.G. Lee, F.E.Doany, S. Assefa, W.M.J. Green, M. Yang, C.L. Schow, C.V. Jahnes, S. Zhang, J. Singer, V.I. Kopp, J.A. Kash, and Y.A. Vlasov, "20-um-Pitch Eight-Channel Monolithic Fiber Array Coupling 160 Gb/s/Channel to Silicon Nanophotonic Chip", Proc. OFC, PDPA4, Optical Society of America, pp. 1-3, (2010).
"Optical fiber connector"; Wikipedia, http://en.wikipedia.org/w/index.php?title=Optical_fiber_connector&oldid=900540631, ed. Jun. 6, 2019 in 7 pages.
"Fiber Optic Adapters—the Bridge between Fiber optic Connectors"; Tutorials of Fiber Optic Products, http://www.fiber-optic-tutorial.com/fiber-optic-adapters-the-bridge-between-fiber-optic-connectors, 2016, in 3 pages.
"Phosphor Bronze Sleeves"; http://www.senko.com/fiberoptic/phosphor-bronze-sleeves.html, 2017, in 2 pages.

* cited by examiner

OPTICAL FIBER CONNECTORS FOR ROTATIONAL ALIGNMENT

CROSS-REFERENCE TO RELATED APPLICATIONS

This application claims the benefit of priority to U.S. Provisional Application No. 62/883,004 filed Aug. 5, 2019, which is incorporated in its entirety by reference herein.

STATEMENT REGARDING FEDERALLY SPONSORED R&D

This invention was made with Government support under N68335-18-C-0814 awarded by the Department of the Navy. The Government has certain rights in this invention.

BACKGROUND

Field

This disclosure relates generally to optical fiber connectors such as optical fiber connectors for rotational alignment.

Description of the Related Art

Rotational alignment can be useful in optical fiber connectors, e.g., for polarization alignment and/or for connectors containing multiple fibers or multicore fibers.

SUMMARY

Example implementations described herein have innovative features, no single one of which is indispensable or solely responsible for their desirable attributes. Without limiting the scope of the claims, some of the advantageous features will now be summarized.

Example Set I

1. An optical fiber connector configured to rotationally align a first optical fiber with a second optical fiber, the connector comprising at least two rotational alignment features, wherein at least one of the two rotational alignment features comprises at least one ferrule configured to hold at least the first optical fiber.

2. The optical fiber connector of Example 1, wherein the first and/or second optical fiber comprises a polarization maintaining fiber.

3. The optical fiber connector of Example 1, wherein the first and/or second optical fiber comprises a multicore fiber.

Example Set II

1. An optical fiber connector system configured to rotationally align a first optical fiber with a second optical fiber, the system comprising:
   at least one connector pair comprising:
     a first connector comprising:
       a first connector insert comprising:
         a first rotational alignment feature comprising a first ferrule configured to hold the first optical fiber, and
         a second rotational alignment feature; and
     a second connector comprising:
       a second connector insert comprising:
         a third rotational alignment feature comprising a second ferrule configured to hold the second optical fiber, and
         a fourth rotational alignment feature.

2. The optical fiber connector system of Example 1, further comprising an adapter, the adapter comprising:
   a fifth rotational alignment feature configured to mate with the first rotational alignment feature of the first connector and with the third rotational alignment feature of the second connector; and
   a sixth rotational alignment feature configured to mate with the second rotational alignment feature of the first connector and with the fourth rotational alignment feature of the second connector.

3. The optical fiber connector system of Example 1, further comprising an adapter, the adapter comprising:
   fifth and sixth rotational alignment features configured to mate with the first rotational alignment feature of the first connector and with the third rotational alignment feature of the second connector, respectively; and
   seventh and eighth rotational alignment features configured to mate with the second rotational alignment feature of the first connector and with the fourth rotational alignment feature of the second connector, respectively.

4. The optical fiber connector system of Example 2 or 3, wherein the fifth and/or sixth rotational alignment feature comprises a receptacle.

5. The optical fiber connector system of any of Examples 2-4, wherein the adapter comprises a main body with one or more grooves or holes configured to receive one or more ferrules or pins.

6. The optical fiber connector system of Example 5, wherein the main body comprises a block of material.

7. The optical fiber connector system of any of Examples 2-6, wherein the adapter is attached to the first or second connector.

8. The optical fiber connector system of any of Examples 2-7, wherein when the first and second connectors are connected, the first and second optical fibers are optically and physically coupled to each other within the adapter.

9. The optical fiber connector system of any of Examples 2-7, wherein when the first and second connectors are connected, the first and second optical fibers are optically coupled and spaced apart from each other within the adapter.

10. The optical fiber connector system of any of Examples 2-9, wherein the first and/or second connector includes a spring.

11. The optical fiber connector system of Example 10, further comprising an enclosure in which said first and/or second connector insert at least partially fits.

12. The optical fiber connector system of Example 11, wherein said first and/or second connector insert is spring loaded in said enclosure.

13. The optical fiber connector system of any of Examples 10-12, wherein the adapter comprises a spring-like split-sleeve.

14. The optical fiber connector system of any of Examples 1-13, wherein the first and second rotational alignment features and/or the third and fourth rotational alignment features are spaced apart by a distance in a range from 1 mm to 20 mm.

15. The optical fiber connector system of any of Examples 1-14, wherein the first connector insert and/or the second connector insert comprises ceramic or stainless steel.

16. The optical fiber connector system of any of Examples 1-15, wherein the second rotational alignment feature of the first connector and/or the fourth rotational alignment feature of the second connector comprises at least one protrusion.

17. The optical fiber connector system of Example 16, wherein the at least one protrusion has a transverse cross-sectional size in a range from 0.5 mm to 5 mm.

18. The optical fiber connector system of Example 16 or 17, wherein the at least one protrusion comprises stainless steel.

19. The optical fiber connector system of any of Examples 16-18, wherein the at least one protrusion is cylindrically shaped.

20. The optical fiber connector system of any of Examples 16-18, wherein the at least one protrusion comprises a right circular cylinder.

21. The optical fiber connector system of any of Examples 16-18, wherein the at least one protrusion comprises a cylinder having a rectangular cross-section.

22. The optical fiber connector system of any of Examples 16-18, wherein the at least one protrusion comprises a cylinder having a square cross-section.

23. The optical fiber connector system of any of Examples 1-22, wherein the first and/or second ferrule comprises a ceramic, glass, or stainless steel fiber ferrule.

24. The optical fiber connector system of any of Examples 1-23, wherein the first ferrule and/or the second ferrule is cylindrically shaped.

25. The optical fiber connector system of any of Examples 1-23, wherein the first ferrule and/or the second ferrule comprises a right circular cylinder.

26. The optical fiber connector system of any of Examples 1-23, wherein the first ferrule and/or the second ferrule comprises a cylinder having a rectangular cross-section.

27. The optical fiber connector system of any of Examples 1-23, wherein the first ferrule and/or the second ferrule comprises a cylinder having a square cross-section.

28. The optical fiber connector system of any of Examples 1-27, wherein the first ferrule and/or the second ferrule comprises a fiber within the first and/or second ferrule.

29. The optical fiber connector system of any of Examples 1-28, wherein the second and/or fourth rotational alignment feature does not comprise a fiber ferrule.

30. The optical fiber connector system of any of Examples 1-28, wherein the second rotational alignment feature of the first connector comprises a ferrule and/or the fourth rotational alignment feature of the second connector comprises a ferrule.

31. The optical fiber connector system of Example 30, wherein the ferrule comprises a ceramic, glass, or stainless steel fiber ferrule.

32. The optical fiber connector system of Example 30 or 31, wherein the ferrule comprises a fiber within the ferrule.

33. The optical fiber connector system of any of Examples 1-32, wherein the second rotational alignment feature of the first connector and/or the fourth rotational alignment feature of the second connector comprises a receptacle configured to mate with a protrusion.

34. The optical fiber connector system of any of Examples 1-33, wherein the first and/or second optical fiber comprises a polarization maintaining fiber.

35. The optical fiber connector system of any of Examples 1-33, wherein the first and/or second optical fiber comprises a multicore fiber.

36. The optical fiber connector system of any of Examples 1-33, wherein the first and/or second optical fiber has a non-circular mode field.

37. The optical fiber connector system of any of Examples 1-36, wherein the at least one connector pair comprises two connector pairs.

38. The optical fiber connector system of any of Examples 1-37, wherein the at least one connector pair comprises three connector pairs.

Example Set III

1. An optical fiber connector system configured to rotationally align a first optical fiber with a second optical fiber, the system comprising:
a connector comprising:
a connector insert comprising:
a first rotational alignment feature comprising a ferrule configured to hold the first optical fiber, and
a second rotational alignment feature; and an adapter comprising:
a third rotational alignment feature configured to mate with the first rotational alignment feature of the connector, and
a fourth rotational alignment feature configured to mate with the second rotational alignment feature of the connector.

2. The optical fiber connector system of Example 1, wherein the third and/or fourth rotational alignment feature comprises a receptacle.

3. The optical fiber connector system of any of Examples 1-2, wherein the adapter comprises a main body with one or more grooves or holes configured to receive one or more ferrules or pins.

4. The optical fiber connector system of Example 3, wherein the main body comprises a block of material.

5. The optical fiber connector system of any of Examples 1-4, wherein the adapter is attached to the connector.

6. The optical fiber connector system of any of Examples 1-5, wherein the connector comprises a spring.

7. The optical fiber connector system of Example 6, further comprising an enclosure in which said connector insert at least partially fits.

8. The optical fiber connector system of Example 7, wherein said connector insert is spring loaded in said enclosure.

9. The optical fiber connector system of any of Examples 1-8, wherein the adapter comprises a spring-like split-sleeve.

10. The optical fiber connector system of any of Examples 1-9, wherein the first and second rotational alignment features are spaced apart by a distance in a range from 1 mm to 20 mm.

11. The optical fiber connector system of any of Examples 1-10, wherein the connector insert comprises ceramic or stainless steel.

12. The optical fiber connector system of any of Examples 1-11, wherein the second rotational alignment feature of the connector comprises at least one protrusion.

13. The optical fiber connector system of Example 12, wherein the at least one protrusion has a transverse cross-sectional size in a range from 0.5 mm to 5 mm.

14. The optical fiber connector system of Example 12 or 13, wherein the at least one protrusion comprises stainless steel.

15. The optical fiber connector system of any of Examples 12-14, wherein the at least one protrusion is cylindrically shaped.

16. The optical fiber connector system of any of Examples 12-14, wherein the at least one protrusion comprises a right circular cylinder.

17. The optical fiber connector system of any of Examples 12-14, wherein the at least one protrusion comprises a cylinder having a rectangular cross-section.

18. The optical fiber connector system of any of Examples 12-14, wherein the at least one protrusion comprises a cylinder having a square cross-section.

19. The optical fiber connector system of any of Examples 1-18, wherein the ferrule comprises a ceramic, glass, or stainless steel fiber ferrule.

20. The optical fiber connector system of any of Examples 1-19, wherein the ferrule is cylindrically shaped.

21. The optical fiber connector system of any of Examples 1-19, wherein the ferrule comprises a right circular cylinder.

22. The optical fiber connector system of any of Examples 1-19, wherein the ferrule comprises a cylinder having a rectangular cross-section.

23. The optical fiber connector system of any of Examples 1-19, wherein the ferrule comprises a cylinder having a square cross-section.

24. The optical fiber connector system of any of Examples 1-23, wherein the ferrule comprises a fiber within the ferrule.

25. The optical fiber connector system of any of Examples 1-24, wherein the second rotational alignment feature does not comprise a fiber ferrule.

26. The optical fiber connector system of any of Examples 1-24, wherein the second rotational alignment feature of the connector comprises another ferrule.

27. The optical fiber connector system of Example 26, wherein the another ferrule comprises a ceramic, glass, or stainless steel fiber ferrule.

28. The optical fiber of any of Example 26 or 27, wherein the another ferrule comprises a fiber within the another ferrule.

29. The optical fiber of any of Examples 1-11, wherein the second rotational alignment feature of the connector comprises at least one receptacle.

30. The optical fiber connector system of any of Examples 1-29, wherein the first and/or second optical fiber comprises a polarization maintaining fiber.

31. The optical fiber connector system of any of Examples 1-29, wherein the first and/or second optical fiber comprises a multicore fiber.

32. The optical fiber connector system of any of Examples 1-29, wherein the first and/or second optical fiber comprises a non-circular mode field.

33. The optical fiber connector system of any of Examples 1-32, wherein the connector comprises a fifth rotational alignment feature.

34. The optical fiber connector system of any of Examples 1-33, wherein the connector comprises a sixth rotational alignment feature.

DETAILED DESCRIPTION

When optically coupling two fibers, there are various alignment degrees of freedom: lateral alignment, longitudinal alignment, angular alignment, and rotational alignment. Lateral alignment relates to alignment (e.g., in the x and/or y directions) between two fibers in a plane perpendicular to the fibers' longitudinal axes (z direction) of the two fibers being optically coupled. Longitudinal alignment relates to the distance or separation between the fibers along the fibers' longitudinal axes (z direction). Angular alignment relates to the angle between the fibers' longitudinal axes. Rotational alignment relates to rotational orientation of the fiber around the fiber's longitudinal (e.g., z) axes.

In various implementations, an optical fiber connector can be configured to rotationally align an optical fiber with another optical fiber. At least two elements can be used to achieve the rotational alignment in the connector. At least one of these elements can contain or be configured to contain at least one optical fiber for rotational alignment. The fiber could be, for example, a fiber with non-circular mode field, a polarization maintaining fiber, or a multicore fiber.

Figure 1:
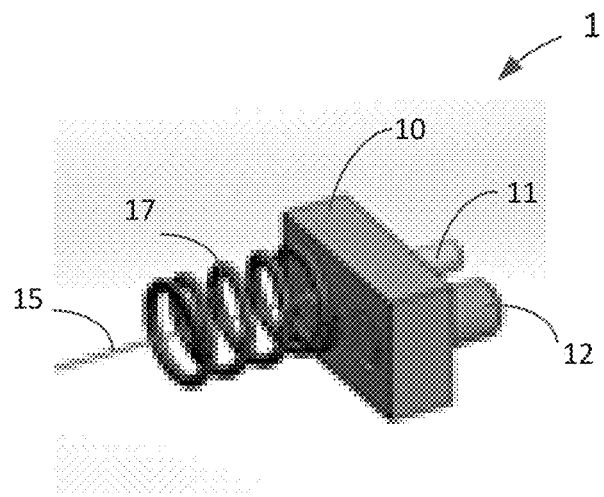
FIG. 1 schematically illustrates an example optical fiber connector.

FIG. 1 schematically illustrates an example optical fiber connector 1. In this example, the inner parts of the connector 1 are shown. As shown in FIG. 1, the connector 1 can include a connector insert 10. The connector 1 can include an enclosure (not shown) in which the connector insert 10 at least partially fits. There may be multiple different types of enclosures and/or inserts for this type of connector, which can be compatible with this rotational alignment style. In some implementations, the connector insert 10 can include a block, mass, plate, etc. (main body). The connector insert 10 can comprise at least two rotational alignment elements (e.g., two rotational alignment features) 11, 12. At least one of the two rotational alignment features 11 can comprise at least one optical fiber ferrule (referred to herein as a ferrule) that is configured to hold at least one optical fiber 15. For example, the ferrule can comprise a material with a channel (e.g., a cylindrical channel) therein sized and shaped to receive, hold, and/or house a fiber. The ferrule can be a fiber ferrule known in the art or yet to be developed. In some instances, the ferrule can be made of ceramic, glass, or stainless steel. The ferrule can be cylindrically shaped. In some instances, the ferrule can have a circular cross-section. In some instances, the ferrule can be a right circular cylinder. In some instances, the ferrule can have a rectangular cross-section. In some instances, the ferrule can have a square cross-section. In various implementations, the ferrule can be a standard sized and/or shaped ferrule.

The other rotational alignment feature 12 of connector 1 can include at least one protrusion. The protrusion can be cylindrically shaped. In some instances, the protrusion can have a circular cross-section. In some instances, the protrusion can be a right circular cylinder. In some instances, the protrusion can have a rectangular cross-section. In some instances, the protrusion can have a square cross-section. As an example, the rotational alignment feature 12 of connector 1 can include a pin. In some instances, the pin can be made of stainless steel. In some instances, the pin can be made of ceramic or glass. As another example, the other rotational alignment feature 12 of connector 1 can include an optical fiber ferrule. In some instances, the ferrule can be made of ceramic, glass, or stainless steel. The ferrule can be configured to hold at least one fiber. For example, the ferrule can comprise a material with a channel (e.g., a cylindrical channel) therein sized and shaped to receive, hold, and/or house a fiber. In some instances, the ferrule may carry an optical fiber such that two rotational alignment features 11, 12 carry optical fibers. In other instances, the ferrule might not carry an optical fiber such that only one rotational alignment feature 11 of the two rotational alignment features carry an optical fiber 15.

In some implementations, the connector insert 10 can include a spring 17. The spring 17 can include any spring known in the art or yet to be developed. In some instances, the connector insert 10 can be spring loaded (e.g., via spring 17) in the enclosure.

Figure 2:
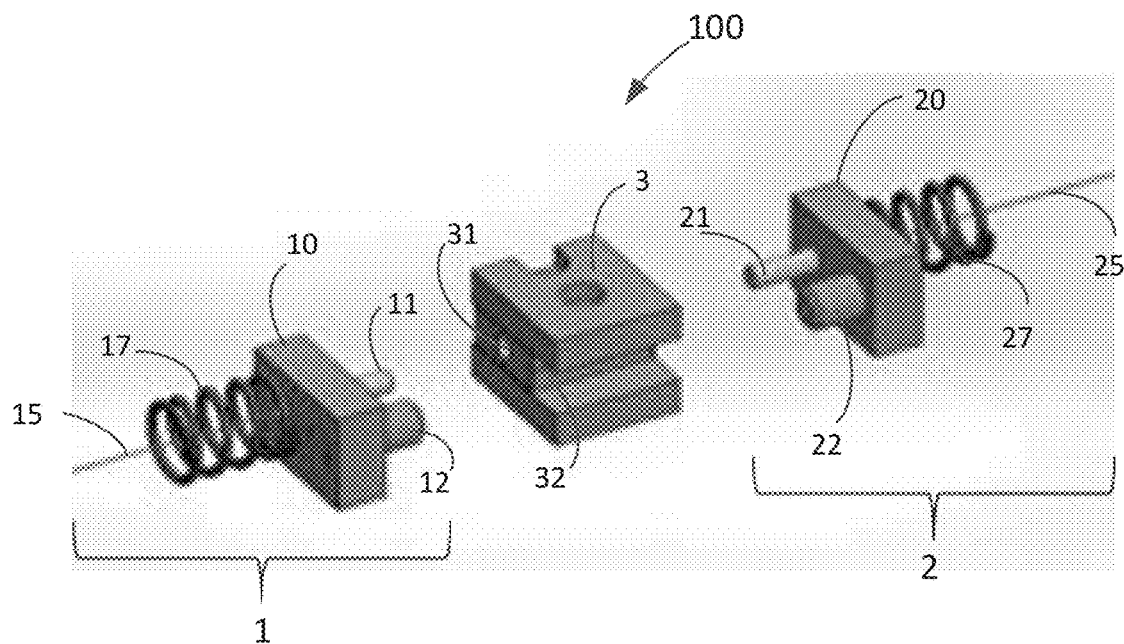
FIG. 2 schematically illustrates an example optical fiber connector system.

In various systems, connector 1 shown in FIG. 1 can be coupled with another connector. Connector 1 can be coupled with another connector similar to the one in FIG. 1, or can be coupled to a different connector type. FIG. 2 schematically illustrates an example optical fiber connector system 100 comprising a connector pair 1, 2. Connector 1 comprises the connector insert 10 as shown in FIG. 1. Connector 2 can comprise a similar connector type. For example, connector 2 can comprise a connector insert 20 with at least two rotational alignment elements (e.g., two rotational alignment features) 21, 22. At least one rotational alignment feature 21 of the two rotational alignment features can comprise at least one ferrule configured to hold at least one optical fiber 25. The other rotational alignment feature 22 can include at least one protrusion (e.g., a pin or a ferrule). In some implementations, the connector insert 20 can include a spring 27. The connector insert 20 can be spring loaded (e.g., via spring 27) in its enclosure.

To help facilitate optical coupling between the two connectors 1, 2, whether the connectors are similar or different from each other, an adapter can be used therebetween. In FIG. 2, adapter 3 (or an adapter insert) can include at least two rotational alignment features 31, 32 configured to mate with the rotational alignment features 11, 12, 21, 22 of the two connectors 1, 2. For example, the rotational alignment feature 31 of adapter 3 can include a receptacle (e.g., a hole, groove, channel, recess, gap, etc.) configured to receive the rotational alignment feature 11 (e.g., ferrule) of connector 1. As another example, the rotational alignment feature 32 can include a receptacle (e.g., a hole, groove, channel, recess, gap, etc.) configured to receive the rotational alignment feature 12 (e.g., pin or ferrule) of connector 1. In some instances, the adapter 3 can include a block or mass of material (e.g. main body) with one or more grooves or holes configured to receive one or more ferrules or pins. In various designs, the dimensions of the main body of the connector insert 10 and/or adapter 3 are such that the rotational alignment features and/or receptacles can be sufficiently separated for the desired rotational alignment tolerance (e.g., from 1 mm to 20 mm as described herein), and are not too large to restrict practical use.

In some implementations, the rotational alignment feature 32 of adapter 3 and the rotational alignment feature 12 of connector 1 can be reversed. For example, the rotational alignment feature 32 of adapter 3 can include a protrusion (e.g., pin) and the rotational alignment feature 12 of connector 1 can include a receptacle. In some implementations, other male-female-style connections can also be used.

In FIG. 2, the rotational alignment feature 31 (e.g., receptacle) of adapter 3 can extend through adapter 3 to also mate with rotational alignment feature 21 (e.g., ferrule) of connector 2. The rotational alignment feature 32 (e.g., receptacle) of adapter 3 can extend through adapter 3 to also mate with rotational alignment feature 22 of connector 2.

In some implementations, instead of rotational alignment features 31 and/or 32 extending through adapter 3 (e.g., extending partly through adapter 3), the adapter 3 can include one or more additional rotational alignment features to mate with rotational alignment features 21, 22 of connector 2. The additional rotational alignment feature(s) can include, for example, a receptacle (e.g., a hole, groove, channel, recess, gap, etc.) to receive the rotational alignment feature(s) (e.g., ferrule or pin) of connector 2.

In various implementations, adapter 3 may be a stand-alone adapter. For example, in FIG. 2, there can be two male-style connectors 1, 2 and one female-female-style adapter 3. Alternatively, the inner part of adapter 3 may be attached (e.g., temporarily or permanently) to one of the connectors, making it a male-female connector pair with an adapter 3 or an adapterless male-female connector pair. For example, in some designs, a first connector can include two protrusions (e.g., two ferrules or one ferrule and one pin) and the second connector can include two receptacles. In some designs, the first connector can include one ferrule and one receptacle and the second connector can include one receptacle and one protrusion.

The disclosed approach can be beneficial for ultra-polished physical contact (UPC), angle-polished physical contact (APC), and expanded-beam (EB) connector systems. For instance, when the connectors 1, 2 are connected, the optical fibers 15, 25 can be optically and physically coupled (e.g., physically contacted) to each other within adapter 3. Alternatively, when the connectors 1, 2 are connected, the optical fibers 15, 25 can be optical coupled and spaced apart from each other within adapter 3. In some such instances, one or more lenses (e.g., one or more GRIN lenses) may be disposed between the optical fibers to focus, collimate, and/or expand light from one fiber to the other. In some implementations, using multicore fibers in expanded-beam connector systems can allow for just one beam-expanding lens pair per multiple optical channels (e.g., two lenses positioned in front of two multicore fibers such that multiple optical beams are collimated and focused with just one lens pair), simplifying connector system design.

In some instances, adapter 3 can include a spring-like sleeve (e.g., a spring-like split-sleeve). In some designs, the adapter can include a tubular shaped sleeve with a slit. The sleeve can be configured to be disposed between a protrusion of a connector and a receptacle of the adapter. By cooperating with the springs 17, 27 in connectors 1, 2, some implementations can improve alignment and/or in some instances, provide self-alignment and/or secure connection.

Figure 3A:
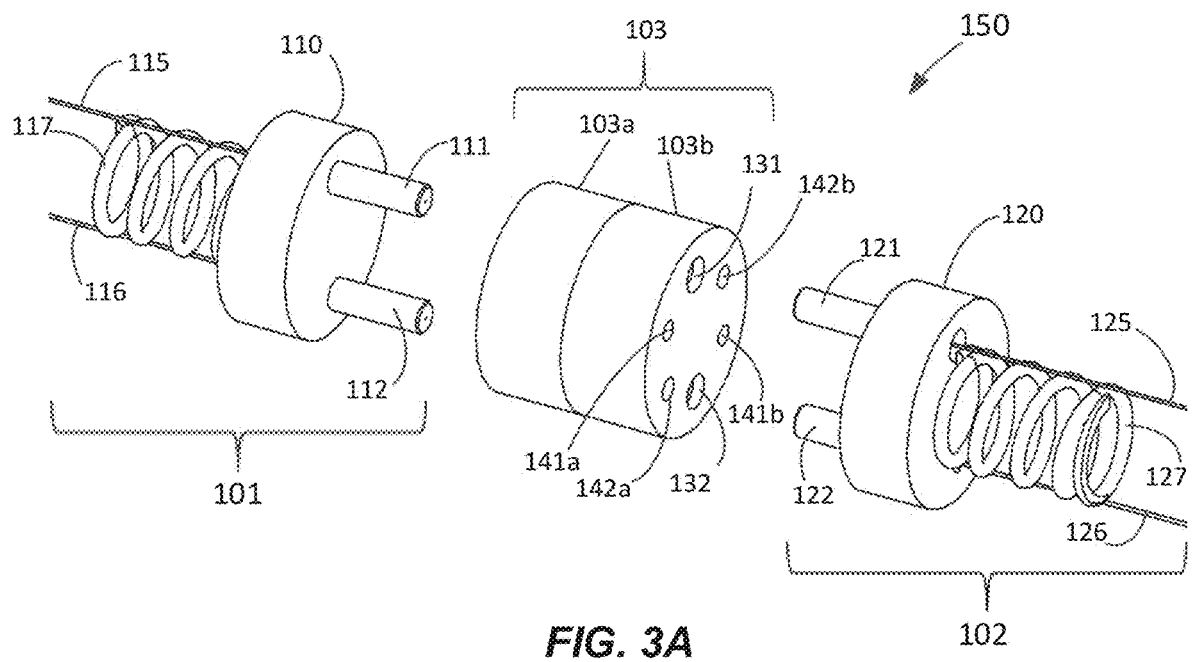
FIGS. 3A and 3B schematically illustrate another example optical fiber connector system.
Figure 3B:
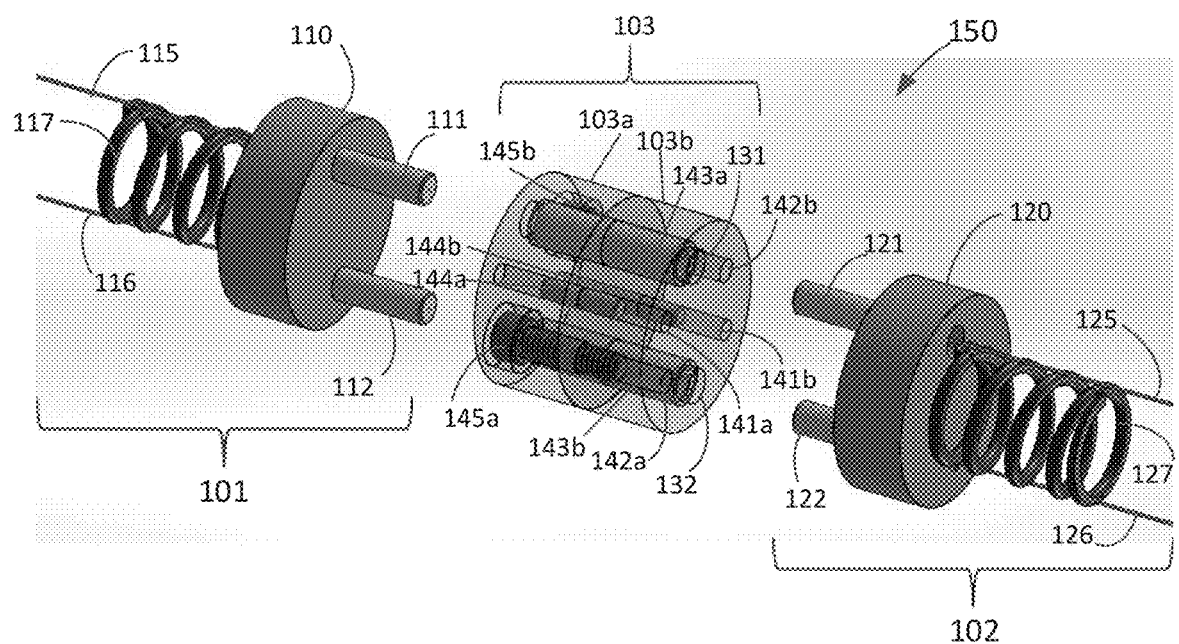

FIGS. 3A and 3B schematically illustrate another example optical fiber connector system 150 comprising a connector pair 101, 102. Connector 101 comprises a connector insert 110 with two rotational alignment features 111, 112 which are shown as both ferrules holding an optical fiber 115, 116. Connector 102 also comprises a connector insert 120 with two rotational alignment features 121, 122 that are also shown as both ferrules holding an optical fiber 125, 126. In some implementations, the connector inserts 110, 120 can include a spring 117, 127.

FIGS. 3A and 3B also show an adapter 103 (or adapter insert) to facilitate coupling between the two connectors 101, 102. FIG. 3A shows an example outer enclosure view, and FIG. 3B shows an example inside view. As shown, the adapter 103 can be provided in multiple parts 103a, 103b. The adapter 103 is shown in two parts 103a, 103b, but the number of parts is not particularly limited. For example, the number of parts provided can be 1, 2, 3, 4, 5, etc. (or any range formed by any such values). As shown in FIG. 3B, the adapter 103 can include at least two rotational alignment features 131, 132, which are shown as both receptacles configured to receive the rotational alignment features 111, 112 of connector 101. As also shown in FIG. 3B, the rotational alignment features 131, 132 (e.g., receptacles) of adapter 103 can extend through adapter 103 to also mate with the rotational alignment features 121, 122 (e.g., ferrules) of connector 102. As shown in FIG. 3B, the rotational alignment features 131, 132 of the adapter 103 can also include spring-like sleeves 143a, 143b that can cooperate with the springs 117, 127 of the connectors 101, 102 to improve self-alignment.

In some implementations, instead of rotational alignment features 131 and/or 132 extending through adapter 103, the rotational alignment features in one part of the adapter 103a configured to mate with the rotational alignment features 111, 112 of connector 101 may be different than the rotational alignment features in another part of the adapter 103b configured to mate with rotational alignment features 121, 122 of connector 102.

As shown in FIG. 3A, the adapter 103 can also include additional 141a, 141b, 142a, 142b receptacles (e.g., hole, groove, channel, recess, gap, etc.) to hold pins and/or screws to connect the parts 103a, 103b of the adapter 103 together. For example, as shown in FIG. 3B, pins 144a, 144b can be provided in receptacles 141a, 141b, and screws 145a, 145b can be provided in receptacles 142a, 142b. Other examples are possible.

Rotational alignment is generally not addressed in standard ferrule connectors (including multi-ferrule connectors). Typically, ferrules can move independently in alignment sleeves from all sides, and even if there are alignment keys implemented in individual ferrules, the rotational tolerances are the same as standard fiber connectors (e.g., related to size, such as the diameter, of the ferrule). Various implementations described herein can provide improved accuracy in rotational alignment. For example, certain connectors can provide two rotational alignment features (e.g., ferrule-pin assembly or ferrule-ferrule assembly) as a single unit (e.g., not move independently). The two rotational alignment features can move as a single unit reducing and/or restricting rotational misalignment. In some designs, the two rotational alignment features can be rigidly connected to each other (e.g., via the main body of the connector).

In some instances, the rotational accuracy and stability can be linearly proportional to the distance between the two rotational alignment features (e.g., ferrule-pin or ferrule-ferrule distance). In various implementations, improved accuracy in rotational alignment can be achieved by having a substantial distance between two alignment features (e.g., between fiber ferrule and pin or between fiber ferrule and fiber ferrule). For example, two rotational alignment features can be spaced apart by a distance in a range from 1 mm to 20 mm, such as 1 mm, 2 mm, 3 mm, 4 mm, 5 mm, 6 mm, 7 mm, 8 mm, 9 mm, 10 mm, 11 mm, 12, mm, 13 mm, 14 mm, 15 mm, 16 mm, 17 mm, 18 mm, 19 mm, 20 mm, or any range formed by any such values (e.g., 1 mm to 10 mm, 1 mm to 15 mm, 2 mm to 10 mm, 2 mm to 15 mm, 2 mm to 20 mm, 3 mm to 10 mm, 3 mm to 15 mm, 3 mm to 20 mm, 5 mm to 10 mm, 5 mm to 15 mm, 5 mm to 20 mm, 7 mm to 20 mm, 10 mm to 20 mm, etc.). In various designs, the distance between the two alignment features can be larger (much larger in some instances) than the size of the ferrule.

In some instances, the rotational tolerance can be improved by providing rotational alignment features having a substantial size for the alignment feature (e.g., pin or ferrule) and/or that are larger than standard size ferrules. As an example, the protrusion (e.g., pin or ferrule) can have a transverse cross-sectional size (e.g., diameter, width, etc.) in a range from 0.5 mm to 5 mm, such as 0.5 mm, 0.7 mm, 0.8 mm, 1 mm, 1.5 mm, 2 mm, 2.5 mm, 3 mm, 3.5 mm, 4 mm, 4.5 mm, 5 mm, or any range formed by any such values (e.g., 0.7 mm to 5 mm, 1 mm to 5 mm, 2 mm to 5 mm, 3 mm to 5 mm, etc.). By providing larger transverse cross-sectional sizes, various designs can allow for tight (very tight in some instances) rotational alignment within a regularly sized hole connection. In some instances, the protrusion-receptacle fit can have a margin in the range from 1 $\mu$m to 100 $\mu$m, such as 1 $\mu$m, 2 $\mu$m, 3 $\mu$m, 4 $\mu$m, 5 $\mu$m, 6 $\mu$m, 7 $\mu$m, 8 $\mu$m, 9 $\mu$m, 10 $\mu$m, 15 $\mu$m, 20 $\mu$m, 25 $\mu$m, 30 $\mu$m, 40 $\mu$m, 50 $\mu$m, 60 $\mu$m, 70 $\mu$m, 75 $\mu$m, 80 $\mu$m, 90 $\mu$m, 100 $\mu$m, or any range formed by any such values (e.g., 1 $\mu$m to 3 $\mu$m, 1 $\mu$m to 5 $\mu$m, 1 $\mu$m to 10 $\mu$m, 1 $\mu$m to 15 $\mu$m, 1 $\mu$m to 20 $\mu$m, 1 $\mu$m to 25 $\mu$m, 1 $\mu$m to 30 $\mu$m, 1 $\mu$m to 40 $\mu$m, 1 $\mu$m to 50 $\mu$m, 1 $\mu$m to 75 $\mu$m, etc.).

Various implementations can provide for cleanability of the optical surface because of easy access to the fiber ferrule. In addition, some implementations can provide for robustness with respect to wear and tear because of the possibility of using a ceramic, glass, or stainless steel fiber ferrule.

Figure 4:
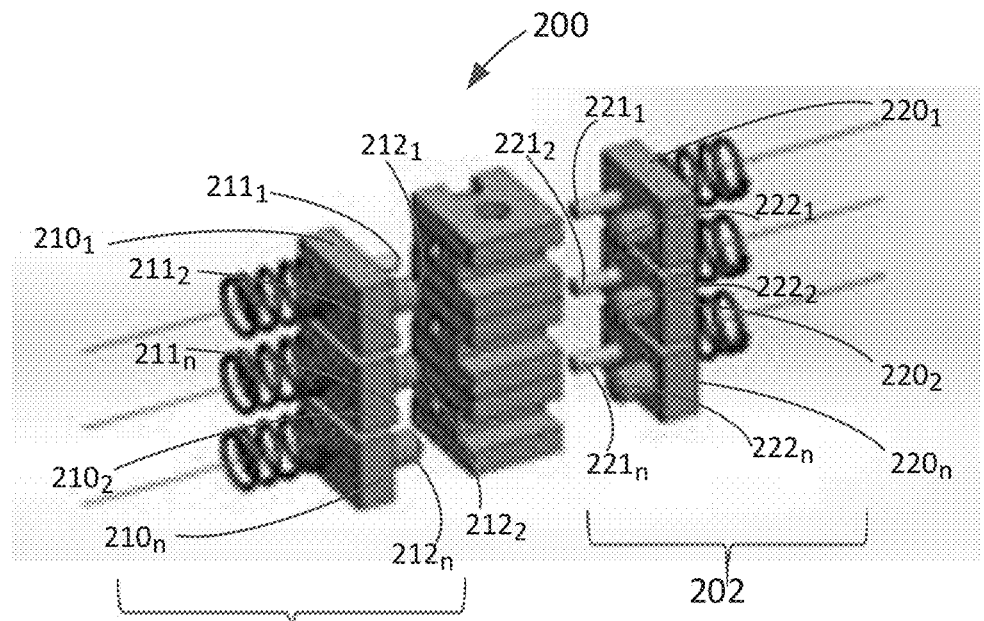
FIG. 4 schematically illustrates another example optical fiber connector system.
Figure 5:
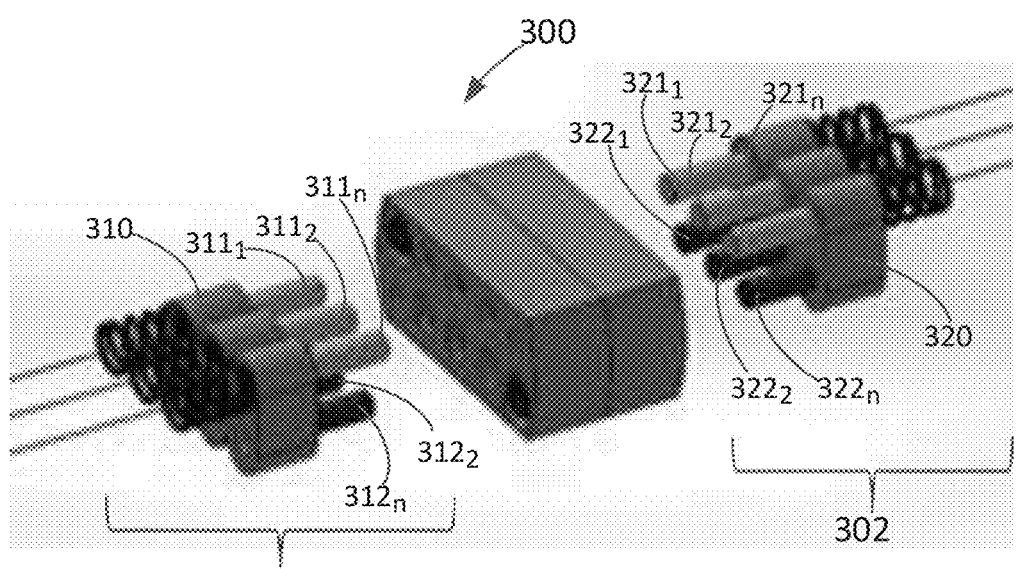
FIG. 5 schematically illustrates another example optical fiber connector system.

FIGS. 4 and 5 schematically illustrate other example optical fiber connector systems 200, 300. In FIGS. 4 and 5, more fiber ferrules and alignment pins may be added for multi-fiber connectors. For example, in FIG. 4, multiple, separate ferrule-pin assemblies and/or inserts $210_1$, $210_2$, ... $210_n$ (or $220_1$, $220_2$, ... $220_n$) having ferrules $211_1$, $211_2$, ... $211_n$ (or $221_1$, $221_2$, ... $221_n$) and/or pins $212_1$, $212_2$, ... $212_n$ (or $222_1$, $222_2$, ... $222_n$) may be part of a single connector 201 (or 202) as shown. As another example, in FIG. 5, multiple, ferrule-pin assemblies having ferrules $311_1$, $311_2$, ... $311_n$ (or $321_1$, $321_2$, ... $321_n$) and/or pins $312_1$ (not shown), $312_2$, ... $312_n$ (or $322_1$, $322_2$, ... $322_n$) may form a single connector insert 310 (or 320) for connector 301 (or 302) as shown. The number n of ferrule/connector pairs can be 2, 3, 4, 5, 6, 7, 8, 9, 10, etc. (or any range formed by any such example values). In some implementations such as shown in FIG. 4, multiple ferrules may be received by a single adapter. In addition, ferrules containing multiple fibers may be advantageously utilized to further increase connector density.

Thus, while there have been shown and described and pointed out fundamental novel features of the invention as applied to preferred embodiments thereof, it will be understood that various omissions and substitutions and changes in the form and details of the devices and methods illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. It is the intention, therefore, to be limited only as indicated by the scope of the claims appended hereto.

What is claimed is:

1. An optical fiber connector system configured to rotationally align a first optical fiber with a second optical fiber, the system comprising:
   at least one connector pair comprising:
      a first connector comprising:
         a first connector insert comprising at least two rotational alignment features on independent separate axes of rotation, the at least two rotational alignment features comprising a first and second rotational alignment feature, the first rotational alignment feature comprising a first ferrule configured to hold the first optical fiber, the first rotational alignment feature configured to rotationally align the second rotational alignment feature;

a second connector comprising:
a second connector insert comprising:
a third rotational alignment feature comprising a second ferrule configured to hold the second optical fiber; and
a fourth rotational alignment feature,
an adapter comprising:
fifth and sixth rotational alignment features configured to mate with the first rotational alignment feature of the first connector and with the third rotational alignment feature of the second connector, respectively; and
seventh and eighth rotational alignment features configured to mate with the second rotational alignment feature of the first connector and with the fourth rotational alignment feature of the second connector, respectively.

2. The optical fiber connector system of claim 1, wherein the adapter is attached to the first or second connector.

3. The optical fiber connector system of claim 1, wherein when the first and second connectors are connected, the first and second optical fibers are optically and physically coupled to each other within the adapter.

4. The optical fiber connector system of claim 1, wherein when the first and second connectors are connected, the first and second optical fibers are optically coupled and spaced apart from each other within the adapter.

5. The optical fiber connector system of claim 1, wherein the first and second rotational alignment features and/or the third and fourth rotational alignment features are spaced apart by a distance in a range from 1 mm to 20 mm.

6. The optical fiber connector system of claim 1, wherein the second rotational alignment feature of the first connector and/or the fourth rotational alignment feature of the second connector comprises at least one protrusion.

7. The optical fiber connector system of claim 6, wherein the at least one protrusion has a transverse cross-sectional size in a range from 0.5 mm to 5 mm.

8. The optical fiber connector system of claim 6, wherein the at least one protrusion is cylindrically shaped.

9. The optical fiber connector system of claim 1, wherein the first and/or second ferrule comprises a ceramic, glass, or stainless steel fiber ferrule.

10. The optical fiber connector system of claim 1, wherein the first ferrule and/or the second ferrule is cylindrically shaped.

11. The optical fiber connector system of claim 1, wherein the second rotational alignment feature of the first connector comprises a ferrule and/or the fourth rotational alignment feature of the second connector comprises a ferrule.

12. The optical fiber connector system of claim 1, wherein the first and/or second optical fiber comprises a polarization maintaining fiber.

13. The optical fiber connector system of claim 1, wherein the first and/or second optical fiber comprises a multicore fiber.

14. The optical fiber connector system of claim 1, wherein the at least one connector pair comprises two connector pairs.

15. The optical fiber connector system of claim 1, wherein individual ones of the at least two rotational alignment features are cylindrically shaped and rotationally symmetric.

16. The optical fiber connector system of claim 1, wherein individual ones of the at least two rotational alignment features are configured to not move independently with one another.

17. The optical fiber connector system of claim 1, wherein the fifth and sixth rotational alignment features are configured to be a single alignment feature configured to mate with the first rotational alignment feature of the first connector and with the third rotational alignment feature of the second connector, and wherein the seventh and eighth rotational alignment features are configured to be a single alignment feature configured to mate with the second rotational alignment feature of the first connector and with the fourth rotational alignment feature of the second connector.

* * * * *